(12) United States Patent
Granger et al.

(10) Patent No.: US 10,227,831 B2
(45) Date of Patent: Mar. 12, 2019

(54) TUBULAR COMPONENT FOR BORING AND EXPLOITING HYDROCARBONS WELLS AND RESULTANT THREADED JOINT

(71) Applicant: TUBOSCOPE VETCO (FRANCE) SAS, Berlaimont (FR)

(72) Inventors: Scott Granger, Houston, TX (US); Olivier Caron, Puteaux (FR); Eric Verger, Gommegnies (FR); Gabriel Roussie, Valenciennes (FR); Jonathan Franchi, Houston, TX (US)

(73) Assignee: TUBOSCOPE VETCO (FRANCE) SAS, Berlaimont (FR)

( * ) Notice: Subject to any disclaimer, the term of this patent is extended or adjusted under 35 U.S.C. 154(b) by 1020 days.

(21) Appl. No.: 14/366,398

(22) PCT Filed: Dec. 14, 2012

(86) PCT No.: PCT/FR2012/000520
§ 371 (c)(1),
(2) Date: Jun. 18, 2014

(87) PCT Pub. No.: WO2013/093233
PCT Pub. Date: Jun. 27, 2013

(65) Prior Publication Data
US 2014/0327242 A1 Nov. 6, 2014

(30) Foreign Application Priority Data
Dec. 19, 2011 (FR) ...................... 11 03930

(51) Int. Cl.
*F16L 15/00* (2006.01)
*E21B 17/042* (2006.01)

(52) U.S. Cl.
CPC ............ *E21B 17/042* (2013.01); *F16L 15/00* (2013.01)

(58) Field of Classification Search
CPC ....... F16L 15/00; F16L 15/004; F16L 15/009; F16L 15/08; F16L 15/008; F16L 15/003; E21B 17/028; E21B 17/003
(Continued)

(56) References Cited

U.S. PATENT DOCUMENTS

| 2,746,486 A * | 5/1956 | Gratzmuller ............. F16J 15/04 123/169 R |
| 8,826,972 B2 * | 9/2014 | Flint ..................... E21B 17/006 166/250.11 |

(Continued)

FOREIGN PATENT DOCUMENTS

| EA | 005874 B1 | 6/2005 |
| EA | 006214 B1 | 10/2005 |

(Continued)

OTHER PUBLICATIONS

International Search Report dated Mar. 5, 2013, in PCT/FR12/000520 filed Dec. 14, 2012.
(Continued)

*Primary Examiner* — Aaron M Dunwoody
(74) *Attorney, Agent, or Firm* — Conley Rose, P.C.

(57) ABSTRACT

A threaded connection for drilling or working hydrocarbon wells includes first and second tubular components with an axis of revolution, each including respective male and female ends. At least one of the male or female ends finishes in a terminal surface including a first abutment surface that can come into interfering contact when the connection is made against a second abutment surface provided on a shoulder produced on an opposing tubular component male or female end. At least one of the first and second abutment surfaces is hollowed out by a groove, defining an exterior abutment zone and an interior abutment zone. In the connection made state, the exterior and interior abutment zones are not coplanar, such that contact pressure of the interior (Continued)

abutment zone exerted in a vicinity of the groove is greater than or equal to a minimum value for contact pressure exerted in the exterior abutment zone.

12 Claims, 6 Drawing Sheets

(58) Field of Classification Search
USPC ............... 285/331, 333, 334, 355; 175/320; 166/242.6; 340/854.4
See application file for complete search history.

(56) References Cited

U.S. PATENT DOCUMENTS

| | | | | |
|---|---|---|---|---|
| 9,121,962 B2* | 9/2015 | Madhavan | ............ | G01V 11/002 |
| 9,157,313 B2* | 10/2015 | Madhavan | ............ | E21B 17/028 |
| 2004/0149471 A1* | 8/2004 | Hall | ............ | E21B 17/003 |
| | | | | 174/21 R |
| 2004/0150532 A1 | 8/2004 | Hall et al. | | |
| 2004/0219831 A1* | 11/2004 | Hall | ............ | E21B 17/028 |
| | | | | 439/578 |
| 2005/0062288 A1* | 3/2005 | Alaria | ............ | E21B 17/042 |
| | | | | 285/357 |
| 2005/0070144 A1* | 3/2005 | Hall | ............ | E21B 17/003 |
| | | | | 439/191 |
| 2005/0230109 A1* | 10/2005 | Kammann | ............ | E21B 44/00 |
| | | | | 166/255.1 |
| 2006/0016590 A1* | 1/2006 | Hall | ............ | E21B 17/028 |
| | | | | 166/65.1 |
| 2006/0260798 A1* | 11/2006 | Hall | ............ | E21B 17/003 |
| | | | | 166/65.1 |
| 2007/0029112 A1* | 2/2007 | Li | ............ | E21B 17/003 |
| | | | | 175/26 |
| 2009/0084541 A1* | 4/2009 | Braden | ............ | E21B 17/028 |
| | | | | 166/242.6 |
| 2010/0224409 A1* | 9/2010 | Sarhad | ............ | E21B 17/003 |
| | | | | 175/40 |
| 2011/0017334 A1* | 1/2011 | Peter | ............ | B21C 23/085 |
| | | | | 138/103 |
| 2011/0174482 A1 | 7/2011 | Verger et al. | | |
| 2014/0034393 A1* | 2/2014 | Mitjans | ............ | E21B 17/028 |
| | | | | 175/320 |
| 2014/0151130 A1* | 6/2014 | Partouche | ............ | E21B 17/028 |
| | | | | 175/320 |

FOREIGN PATENT DOCUMENTS

| | | |
|---|---|---|
| FR | 2 937 077 A1 | 4/2010 |
| JP | 59-83887 | 5/1984 |
| RU | 2220272 C1 | 12/2003 |
| SU | 1602403 A3 | 10/1990 |
| WO | 02/12769 A1 | 2/2002 |

OTHER PUBLICATIONS

Decision on the grant of a patent for an invention for Russian Patent Application No. 2014124011103, dated Nov. 10, 2016, 17 pages.

* cited by examiner

TUBULAR COMPONENT FOR BORING AND EXPLOITING HYDROCARBONS WELLS AND RESULTANT THREADED JOINT

The present invention relates to a component used for drilling and working hydrocarbon wells, and more precisely to the end of such a component, said end being male or female in type and capable of being connected to a corresponding end of another component also used for drilling and working hydrocarbon wells.

The term "component used for drilling and working hydrocarbon wells" means any element with a substantially tubular shape intended to be connected to another element of the same type or otherwise to finish by constituting either a stem for drilling a hydrocarbon well or an offshore riser for maintenance, such as a work over riser, or for working, such as risers, or a casing string or tubing string involved in well working. In particular, the invention is applicable to components used in a drill stem such as drill pipes, heavy weight drill pipes, drill collars and parts for connecting pipes and heavy weight pipes known as tool joints.

In known manner, each component used in a drill stem generally comprises an end provided with a male threaded end and an end provided with a female threaded zone each intended to be connected by makeup with the corresponding end of another component, the assembly defining a connection. The stem produced in this manner is rotated during drilling from the surface of the well; for this reason, the components have to be made up together with a high torque in order to be able to transmit a sufficient rotational torque to allow drilling in the well without breakout or, in contrast, over-torqueing. The makeup torque is generally reached by means of interfering cooperation of abutment surfaces provided on each of the components to be made up.

However, under certain conditions of drilling or use of the connections, gas may be encountered under pressure. The seal, until now provided by the abutment surfaces, is then no longer ensured. In addition, it is necessary to guarantee a higher quality seal corresponding to high pressures at the connection between two components. To this end, it is known with other types of connections, such as VAM® TOP connections described in the Applicant's catalogue No 940, to provide, on the male end of the connection beyond the threaded zone, a sealing surface intended to cooperate with a radial interference fit with a sealing surface provided on the female end of the connection. More precisely, the interference fit type cooperation between the two surfaces is accomplished by force fitting the sealing surface of the male end below the sealing surface of the female end during assembly of the connection by makeup. In order to facilitate force fitting, it is known, for example, to employ sealing surfaces with a tapered shape on each of the male and female ends.

However, because current specifications have a tendency to demand seals that are compatible with very high pressures, it is necessary to impose high contact pressures at the sealing surfaces, said contact pressures being produced by interference between the male element and the female element. The term "interference" means the difference between the value for the mean diameter of the portion carrying the sealing surface of the male end before force fitting, and the value for the mean diameter of the portion carrying the sealing surface of the male end once it has been fitted into the female end.

Because of the thicknesses of the components used in a drill stem, which are of the order of 4.8 to 101.6 mm (i.e. 0.19 to 4 inches) according to the dimensional specifications given by API standard 7, which is the standard defined by the American Petroleum Institute for drilling components, a problem arises with galling during force fitting, said galling being a function of the value of the contact pressure and thus the interference and thickness of the component. The same problem arises for connections for high pressure work over risers or for thick casing or production tubes.

In order to reduce the risks of galling, several solutions have been envisaged. A first route to improvement, consisting of reducing interference, has been studied. It turned out that it was incompatible with admissible machining tolerances. In fact, the maximum admissible separations and defects in concentricity of the mean diameter of the portion carrying the male sealing surface while preserving the seal would have had to have been limited.

A second route to improvement consisted of reducing the interference while extending the sealing surface. However, studies have shown that lengthening the contact length between the two sealing surfaces increases the instability of said contact, and thus may induce a loss of seal under certain conditions of service.

A third path to improvement consisted of reducing principally the radial stiffness of the portion carrying the male sealing surface. This is obtained by providing, at the internal abutment surfaces, a groove in the thickness of the terminal portion of the male end as well as in the thickness of the shoulder of the female end.

That solution also has the advantage of guaranteeing improved contact pressure at the internal abutment surfaces due to the reduction in the axial stiffness. Thus, when the tubular component is under tension, the abutment surfaces remain in contact due to the elastic resilience of the terminal portion of the male end which is initially made up hard against the shoulder. For that reason, it is possible to guarantee the seal at the abutment surfaces and thus to dispense with the sealing surfaces provided respectively on the exterior and interior circumferential surface of the male and female ends.

However, the prior art as proposed in patent FR 2 937 077 proposes distributing the contact pressures at the abutment surfaces which reduces when approaching grooves formed in the terminal portion of the male end as well as in the thickness of the shoulder of the female end. Further, the contact pressures are smaller at the zone defined between the groove and the inside of the tubular components compared with the contact pressures being exerted in the zone defined between the groove and the outside of the tubular components. Those imbalances in the contact pressures have the disadvantage of weakening the contact between the abutment surfaces, which may lead to failures in the seal or even breakout of the components.

For this reason, the invention is aimed at redefining the abutment surfaces in order to reinforce the contact pressures in the abutment zone internally of the groove. In this manner, an axial seal is obtained by optimizing the contact at the abutment zones.

More precisely, the invention concerns an assembly for producing a threaded connection for drilling or working hydrocarbon wells, said connection comprising a first and a second tubular component with an axis of revolution, each being provided with a respective male and female end, at least one of the male or female ends finishing in a terminal surface comprising a first abutment surface which can come into interfering contact when the connection is in the made up state, against a second abutment surface which is itself provided on a shoulder produced on the other end, at least one of the first and second abutment surfaces being hollowed out by a groove, thereby defining an exterior abutment zone and an interior abutment zone, characterized in that in the made up state, at least one of the exterior and interior abutment zones form an axial protuberance, such that the contact pressure of the interior abutment zone being exerted in the vicinity of the groove is greater than or equal to the minimum value for the contact pressure being exerted in the exterior abutment zone.

Optional characteristics of the invention, which may be by addition or substitution, are defined below.

The first abutment surface is provided on the terminal surface of the male end, while the second abutment surface is provided on a shoulder produced on the female end.

The exterior and interior abutment zones of the abutment surface hollowed out by the groove respectively belong to a first and to a second plane, which are distinct, each being perpendicular to the axis of revolution, the interior abutment zone protruding with respect to the exterior abutment zone.

The first and the second planes are separated by a values in the range 0.025 mm to 0.075 mm.

The exterior and interior abutment zones of the abutment surface hollowed out by the groove are convex surfaces belonging to a spherical envelope with radius R.

The radius R of the sphere is in the range 500 mm to 2700 mm.

The exterior abutment zone of the abutment surface hollowed out by the groove is located in a plane inclined with respect to a plane perpendicular to the axis of revolution at an angle α in the range 0.5 to 2 degrees, and such that the portion proximal to the groove projects with respect to the portion distal to the groove.

The interior abutment zone of the abutment surface hollowed out by the groove is located in a plane inclined with respect to a plane perpendicular to the axis of revolution at an angle β in the range 0.5 to 2 degrees, such that the portion proximal to the groove projects with respect to the portion distal to the groove.

The section esup of the exterior abutment zone is in the range 1.5 to 3 times the section einf of the interior abutment zone.

The first and second abutment surfaces are each hollowed out by a groove, the groove hollowing out the first abutment surface defining, on either side, an exterior abutment zone and an interior abutment zone, while the groove hollowing out the second abutment surface defines an exterior abutment zone and an interior abutment zone on either side.

At their terminal surface, the male and female ends each comprise a first abutment surface which can come into interfering contact when the connection is in the made up state, against a second abutment surface which is itself provided on a shoulder produced on the other end.

The first and second tubular components are tubular drilling components.

The characteristics and advantages of the invention are described in more detail in the description below made with reference to the accompanying drawings.

Figure 1:
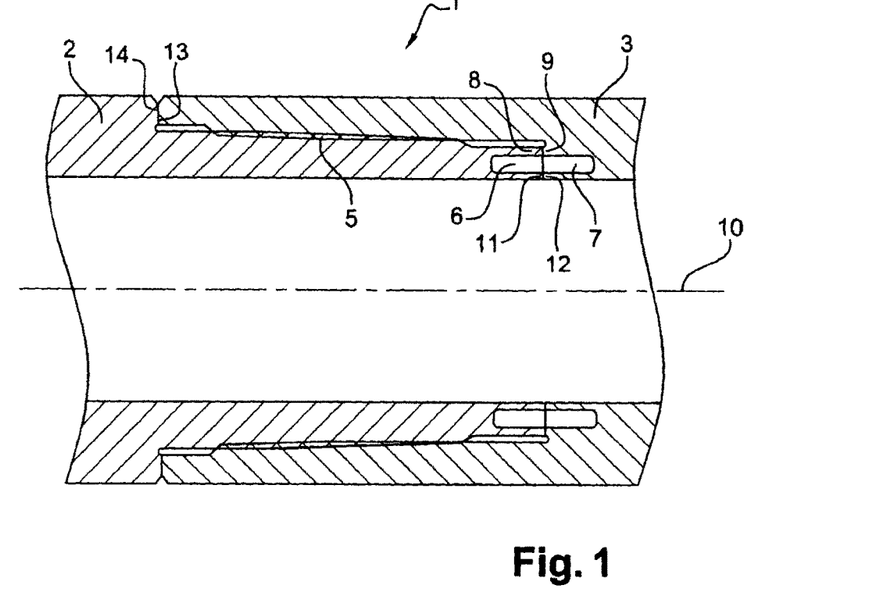
FIG. 1 is a diagrammatic view in longitudinal section of a connection resulting from connecting two tubular components by makeup in accordance with a first embodiment of the invention.

FIG. 1 shows a threaded connection 1 in the made up state with an axis of revolution 10, comprising a first tubular component with the same axis of revolution 10 provided with a male end 2 and a second tubular component with the same axis of revolution 10 provided with a female end 3, the male end and the female end being made up together. The two ends 2 and 3 each finish in a terminal surface, respectively 60 and 13, orientated substantially radially with respect to the axis 10 of the threaded connection and are respectively provided with threaded zones 5 which cooperate together for mutual assembly of the two components by makeup. The term "threaded zones" means portions of the circumferential surface of a tubular component having a continuous threading, i.e. with no interruption to the threading helix.

Figure 2:
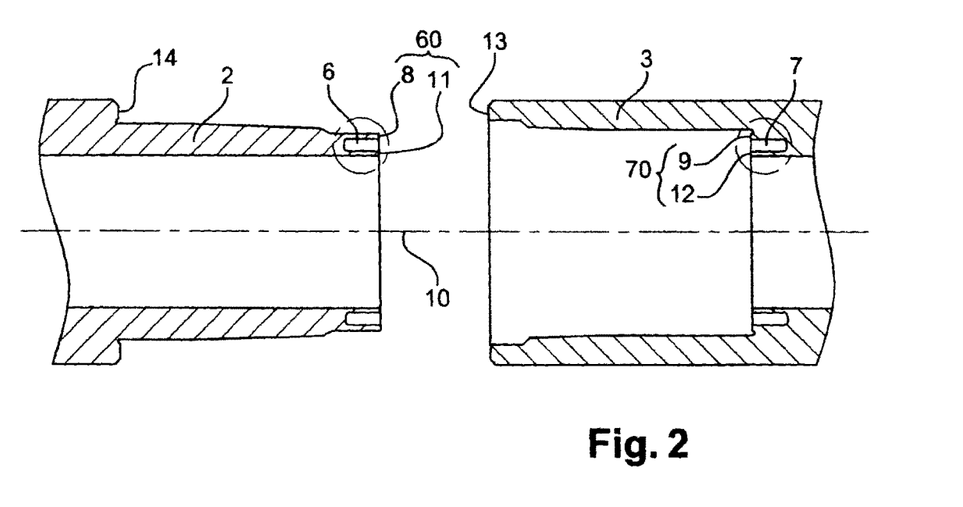
FIG. 2 is a diagrammatic view in longitudinal section of an assembly of two tubular components before connection by makeup, in accordance with an embodiment of the invention.

In FIGS. 1 and 2, the connection 1 comprises an external abutment bringing the terminal surface 13 of the female end 3 into the presence of a shoulder 14 provided on the male end 2, said terminal surface and said shoulder being arranged to come into interfering contact when the connection is in the made up condition.

According to FIGS. 1 and 2, the connection 1 also comprises an internal abutment bringing a first abutment surface 60 provided on the terminal surface of the male end 2 into the presence of a second abutment surface 70 provided on a shoulder provided inside the female end 3, said first and second abutment surfaces 60 and 70 being arranged to come into interfering contact when the connection 1 is in the made up condition.

According to the embodiment detailed in FIGS. 1 and 2, the terminal surface of the male end 2 and the shoulder provided inside the female end 3 each comprise a recess with respective references 6 and 7. Said recesses 6 and 7 are each a groove with a substantially annular shape. Said grooves 6 and 7 mean that the radial stiffness as well as the axial stiffness can be reduced. The skilled person will be able to define the groove 6, in particular in terms of shape, length and thickness, as a function of the desired reduction in radial stiffness. For this reason, galling risks will be limited and contact between the abutment surfaces remains assured even when the connection is under tension/compression. Similarly, the skilled person will be able to define the groove 7, especially in terms of shape, length and thickness, as a function of the desired reduction in axial stiffness. For this reason, the internal abutment will have a more elastic behaviour which will guarantee contact of the abutment surfaces when the connection is under tension/compression.

As has been described in FIGS. 1 and 2, the groove 6 formed in the terminal surface of the male end thus defines an exterior abutment zone 8 and an interior abutment zone 11, said exterior and interior abutment zones defining the first abutment surface 60 of the internal abutment.

Similarly, as described in FIGS. 1 and 2, the groove 7 formed in the shoulder of the female end thus defines an exterior abutment zone 9 and an interior abutment zone 12, said exterior and interior abutment zones defining the second abutment surface 70 of the internal abutment.

Figure 3A:
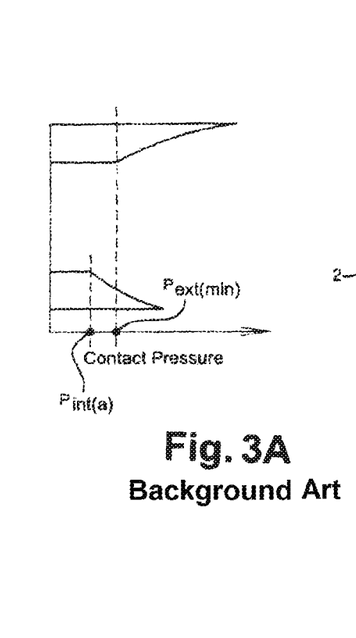
FIG. 3A is a diagrammatic view of the contact pressure in a background art connection.
Figure 3B:
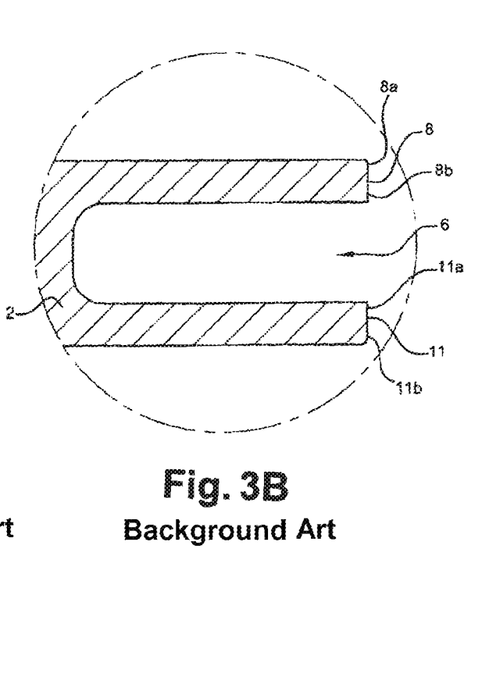
FIGS. 3B and 3C are diagrammatic views in a longitudinal section of details of a background art connection.
Figure 3C:
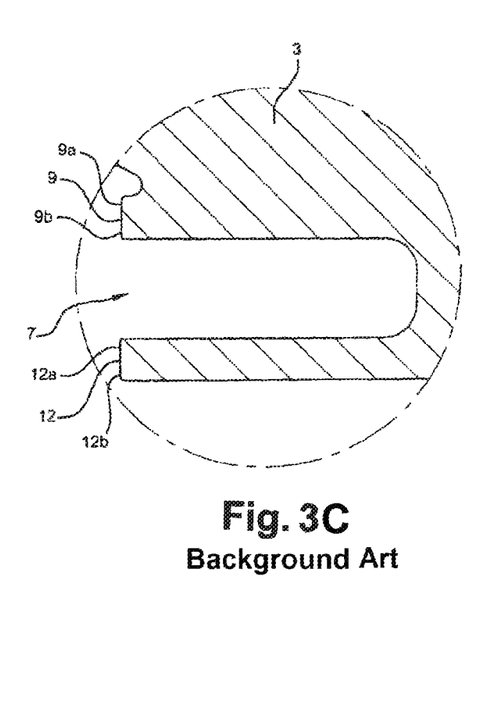

FIGS. 3B and 3C describe a background art connection comprising, using the same reference numerals employed for FIGS. 1 and 2, a first and a second abutment surface respectively hollowed out by grooves 6 and 7 each thus defining an exterior abutment zone 8, 9 and an interior abutment zone 11, 12. The abutment zones 8, 11 of the first abutment surface 60 respectively comprise a portion 8b and 11a proximal to the groove 6 and respectively comprise a portion 8a and 11b distal to the groove 6. Similarly, the abutment zones 9, 12 of the second abutment surface 70 respectively comprise a portion 9b and 12a proximal to the groove 7 and respectively comprise a portion 9a and 12b distal to the groove 7.

FIG. 3A describes a diagram of the distribution of contact pressures for a background art connection as described in FIGS. 3B and 3C, said connection being in the made up condition, at the exterior abutment zones 8 and 9 and at the interior abutment zones 11 and 12. The exterior abutment zones 8 and 9 are mutually coplanar. Similarly, the interior abutment zones 11 and 12 are also mutually coplanar.

Thus, it appears that the contact pressure Pint (a) which is exerted at the portions 11a, 12a proximal to the grooves 6, 7 for the interior abutment zones 11, 12 is smaller than the minimum contact pressure Pext (min) which is exerted in the exterior abutment zones 8, 9 of the first and second abutment surfaces 60 and 70. For this reason, contact is less stable at the interior abutment zones 11 and 12 than at the exterior abutment zones 8 and 9.

In contrast, in according with the principal characteristic of the invention, in the made up state, at least one of the exterior 9 and interior 12 abutment zones of the second abutment surface 70 forms an axial protuberance and the abutment zones are arranged such that the contact pressure Pint (a) of the interior abutment zone 12 being exerted in the vicinity 12a of the groove 7 is greater than or equal to the minimum value for the contact pressure Pext (min) being exerted in the exterior abutment zone 9. The term "axial protuberance" means that at least one if not both of the abutment zones projects outwards. They are not in the same plane. This protuberance is located in the vicinity of the groove so as to optimize the contact pressure of the interior abutment zone. In this manner, the contact is greater at the interior abutment zones 11 and 12 than at the exterior abutment zones 8 and 9. The risks of leaks from the interior of the tubes towards the exterior are thus reduced.

The invention encompasses a certain number of variations regarding the arrangement of the exterior 9 and interior 12 abutment zones of the second abutment surface 70.

Figure 4A:
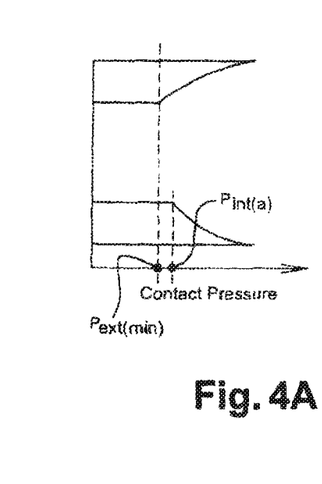
FIG. 4A is a diagrammatic view of the contact pressure in a connection in accordance with a first embodiment of the invention.
Figure 4B:
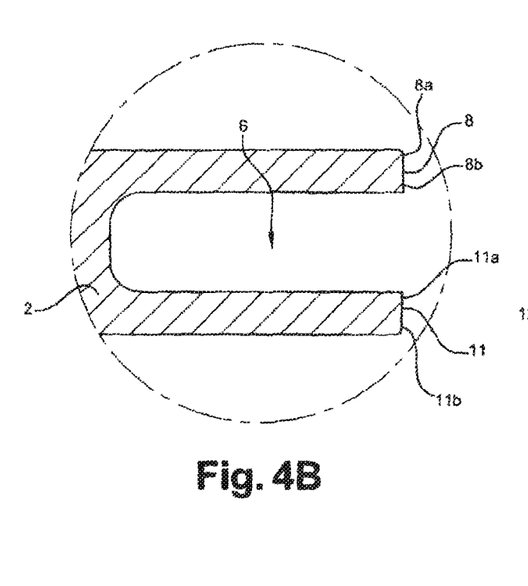
FIGS. 4B and 4C are diagrammatic views in a longitudinal section of details of a connection in accordance with a first embodiment of the invention.
Figure 4C:
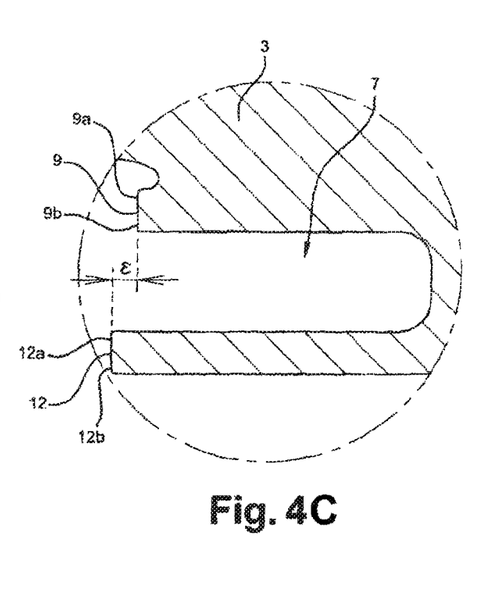

FIGS. 4B and 4C describe a connection in accordance with a first variation of the invention with identical reference numbers to those given in the preceding figures, i.e. a first and a second abutment surface respectively hollowed out by grooves 6 and 7 each thereby defining an exterior abutment zone 8, 9 and an interior abutment zone 11, 12. The abutment zones 8, 11 of the first abutment surface 60 respectively comprise a portion 8b and 11a proximal to the groove 6 and respectively comprise a portion 8a and 11b distal to the groove 6. Similarly, the abutment zones 9, 12 of the second abutment surface 70 respectively comprise a portion 9b and 12a proximal to the groove 7, and respectively comprise a portion 9a and 12b distal to the groove 7.

In this variation, the exterior 9 and interior 12 abutment zones of the abutment surface 70 hollowed out by the groove 7 respectively belong to a first and to a second plane, which are distinct from each other, each being perpendicular to the axis of revolution 10 and the interior abutment zone 12 protruding with respect to the exterior abutment zone 9. As can be seen in FIG. 4A, the contact pressure Pint (a) being exerted in the vicinity 12a of the groove 7 is greater than the minimum contact pressure Pext (min) being exerted in the exterior abutment zone 9.

Advantageously, the first and second planes are separated by a value ε in the range 0.025 mm to 0.075 mm; in this manner, the contact pressure Pint (a) being exerted in the vicinity 12a of the groove 7 is higher than the minimum contact pressure Pext (min) being exerted in the exterior abutment zone 9. In this manner, for groove depths of 10 mm to 25 mm, this embodiment can prevent a reverse differential in contact pressures between the surfaces 11 and 12 and the surfaces 8 and 9, which is as high as 300 MPa for a standard connection in according with FIG. 3.

Figure 5A:
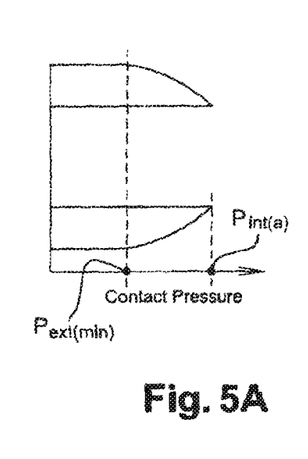
FIG. 5A is a diagrammatic view of the contact pressure in a connection in accordance with a second embodiment of the invention.
Figure 5B:
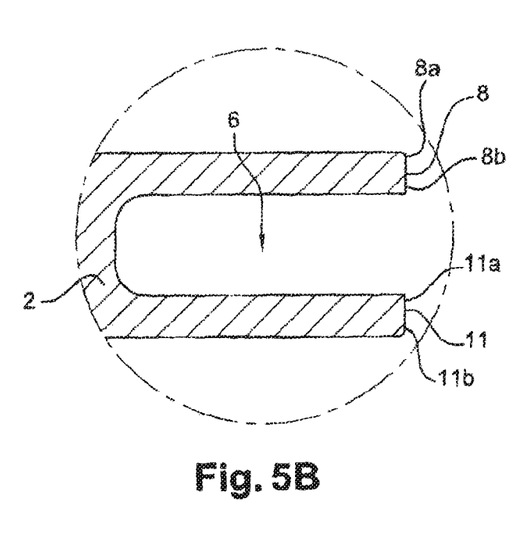
FIGS. 5B and 5C are diagrammatic views in a longitudinal section of details of a connection in accordance with a second embodiment of the invention.
Figure 5C:
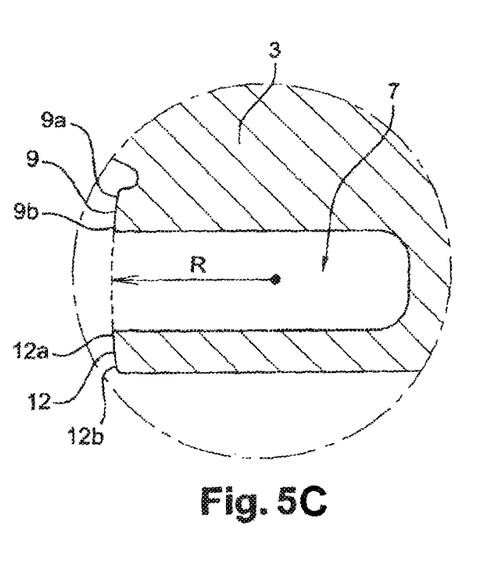

FIGS. 5B and 5C describe a connection in according with a second variation of the invention with identical reference numerals to that of the preceding figures, i.e. a first and second abutment surface respectively hollowed out by grooves 6 and 7 each thus defining an exterior abutment zone 8, 9 and an interior abutment zone 11, 12. The abutment zones 8, 11 of the first abutment surface 60 respectively comprise a portion 8b and 11a proximal to the groove 6, and respectively comprise a portion 8a and 11b distal to the groove 6. Similarly, the abutment zones 9, 12 of the second abutment surface 70 respectively comprise a portion 9b and 12a proximal to the groove 7 and respectively comprise a portion 9a and 12b distal to the groove 7.

In this variation, the exterior 9 and interior 12 abutment zones of the abutment surface 70 hollowed out by the groove 7 are convex surfaces belonging to a spherical envelope with radius R. As can be seen in FIG. 5A, the contact pressure Pint (a) being exerted in the vicinity 12a of the groove 7 is greater than the minimum value for the contact pressure Pext (min) being exerted in the exterior abutment zone 9.

Advantageously, the radius R of the sphere is in the range 500 mm to 2700 mm; in this manner, the contact pressure Pint (a) being exerted in the vicinity 12a of the groove 7 is greater than the minimum value for the contact pressure Pext (min) being exerted in the exterior abutment zone 9. The advantage of this embodiment is that the contact pressure is a maximum at the portions 8b, 9b, 11 a and 12a. This embodiment employs a radius allowing the distribution of the contact pressure to be easily controlled; it is also easy to manufacture. The minimum of 500 mm for R is selected to ensure that the surfaces 8a, 9a, 11b and 12b remain in contact even if plastification occurs at the surfaces 8b, 9b, 11a and 12a.

Figures 6A, 6B:
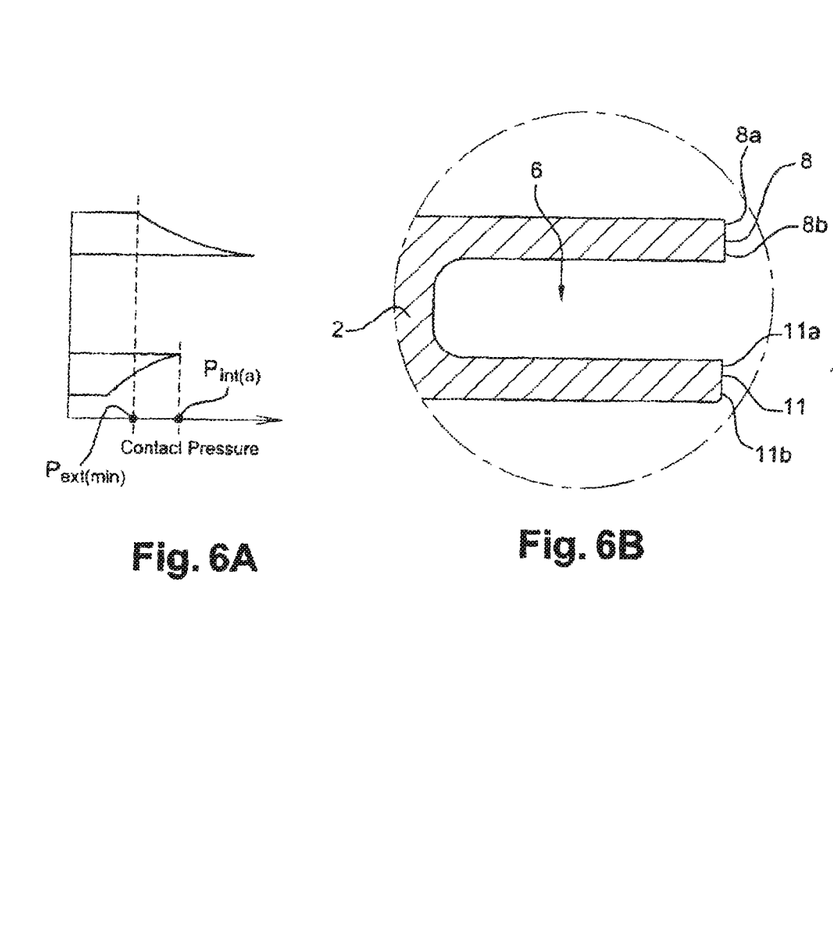
FIG. 6A is a diagrammatic view of the contact pressure in a connection in accordance with a third embodiment of the invention.
FIGS. 6B and 6C are diagrammatic views in a longitudinal section of details of a connection in accordance with a third embodiment of the invention.
Figure 6C:
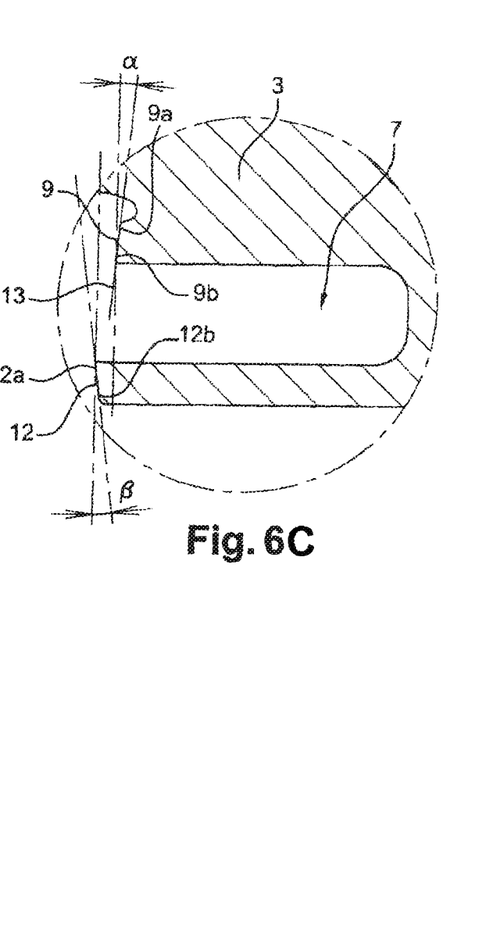

FIGS. 6B and 6C describe a connection in according with a second variation of the invention with identical references to that of the preceding figures, i.e. a first and a second abutment surface respectively hollowed out by the grooves 6 and 7 each thus defining an exterior abutment zone 8, 9 and an interior abutment zone 11, 12. The abutment zones 8, 11 of the first abutment surface 60 respectively comprise a portion 8b and 11a proximal to the groove 6 and respectively comprise a portion 8a and 11b distal to the groove 6. Similarly, the abutment zones 9, 12 of the second abutment surface 70 respectively comprise a portion 9b and 12a proximal to the groove 7 and respectively comprise a portion 9a and 12b distal to the groove 7.

In this variation, the exterior abutment zone 9 of the abutment surface 70 hollowed out by the groove 7 is located in a plane which is inclined with respect to a plane perpendicular to the axis of revolution 10 at an angle β in the range 0.5 to 2 degrees such that the proximal portion 9b of the groove projects with respect to the distal portion 9a.

Similarly, the interior abutment zone 12 of the abutment surface 70 hollowed out by the groove 7 is located in a plane which is inclined with respect to a plane perpendicular to the axis of revolution 10 at an angle β in the range 0.5 to 2 degrees such that the portion 12a proximal to the groove projects with respect to the distal portion 12a.

As can be seen in FIG. 6A, the contact pressure Pint (a) being exerted in the vicinity 12a of the groove 7 is greater than the minimum value for the contact pressure Pext (min) being exerted in the exterior abutment zone 9. It is important to note that if the angles were too large, the contact pressures in the portions 8b, 9b, 11a and 12a would be too high and there would be risks of plastification of the abutment surfaces or even failures in the seal. In contrast, if the angles were too small, machining would be difficult to control and the sought effect, namely an increase in the contact pressures at the portions 8b, 9b, 11a, 12a, would not be sufficient.

Figure 7A:
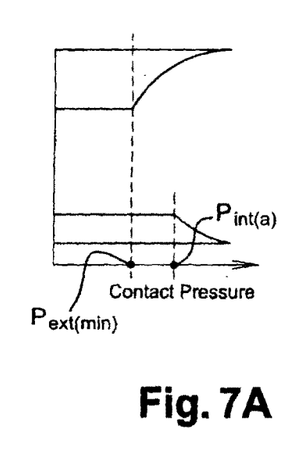
FIG. 7A is a diagrammatic view of the contact pressure in a connection in accordance with a fourth embodiment of the invention.
Figure 7B:
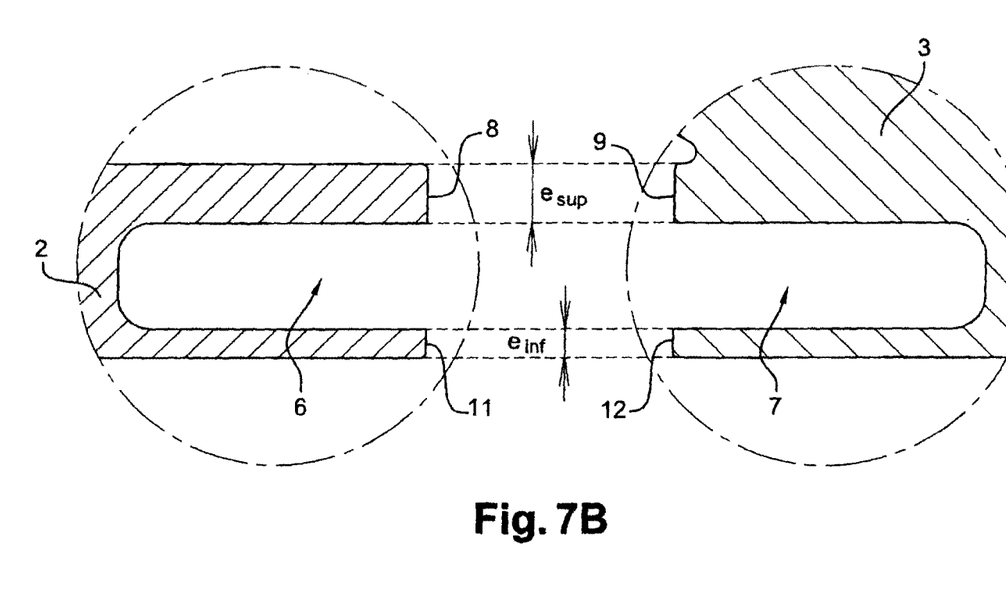
FIG. 7B is a diagrammatic view in longitudinal section of a detail of a connection in accordance with the fourth embodiment of the invention.

Advantageously and as described in FIG. 7B, with the aim of further reinforcing the contact pressure Pint (a) being exerted in the vicinity 12a, the section esup of the exterior abutment zone is in the range 1.5 to 3 times the section einf of the interior abutment zone. More particularly, if the section esup is equal to 1.5 times the section einf, the contact pressures at the portions 8b, 9b and the portions 11a, 12a are equalized. In contrast, if the section esup is equal to 3 times the section einf, the contact pressures at the portions 8b, 9b will be 50% to 100% lower than at the portions 11a, 12a.

As can be seen in FIG. 7A, the contact pressure Pint (a) being exerted in the vicinity of portions 11a and 12a proximal to the respective grooves 7 and 6 is greater than the minimum contact pressure Pext (min) being exerted in the respective exterior abutment zones 8 and 9.

Clearly, further variations, not shown in the figures, are possible.

Hence, the abutment surface 60 of the male end may be a solid disk, substantially perpendicular to the axis 10, albeit hollowed out by the groove 6.

It is also possible to envisage that the preceding variations may be applied to the male end. In this case, the exterior 8 and interior 11 abutment zones of the abutment surface 60 hollowed out by the groove 6 would respectively belong to a first and to a second plane distinct from each other, each being perpendicular to the axis of revolution 10 and the interior abutment zone 11 protruding with respect to the exterior abutment zone 8. In this case, the contact pressure Pint (a) being exerted in the vicinity 11a of the groove 6 would be higher than the value of the minimum contact pressure Pext (min) being exerted in the exterior abutment zone 8.

Similarly, in another variation, it is possible to have a configuration in which the exterior 8 and interior 11 abutment zones of the abutment surface 60 hollowed out by the groove 6 are convex surfaces belonging to a spherical envelope with radius R.

Similarly, in another variation, it is possible to have a configuration in which the exterior abutment zone 8 of the abutment surface 60 hollowed out by the groove 6 is located in a plane inclined with respect to a plane perpendicular to the axis of revolution 10 at an angle α in the range 0.5 to 2 degrees such that the portion 8b proximal to the groove projects with respect to the distal portion 8a.

Similarly, the interior abutment zone 11 of the abutment surface 60 hollowed out by the groove 6 is located in a plane inclined with respect to a plane perpendicular to the axis of revolution 10 at an angle β in the range 0.5 to 2 degrees such that the portion 11a proximal to the groove projects with respect to the distal portion 11b.

Clearly, the abutment surface 70 of the female end facing the male abutment surface 60 may be a solid disk, substantially perpendicular to the axis 10, albeit hollowed out by the groove 7.

The invention may also be applied to the external abutment bringing the terminal surface 13 of the female end 3 into the presence of the shoulder 14 provided on the male end 2. In this case, it is necessary to provide at least one of the two abutment surfaces 13, 14 with a groove which in this manner will respectively define an exterior abutment zone and an interior abutment zone. Each of the exterior and interior abutment zones will comprise a distal portion and a proximal portion with respect to said groove.

Advantageously, the invention is of particular application to tubular drilling components because their shouldering torques are particularly high.

The invention claimed is:

1. A threaded connection for drilling or working hydrocarbon wells, the connection comprising:
   a first and a second tubular component with an axis of revolution, each including a respective male end and female end, at least one of the male end or female end finishing in a terminal surface comprising a first abutment surface that can come into interfering contact when the connection is in a made-up state against a second abutment surface provided on a shoulder produced on an other of the male end or female end that is on an opposing one of the first and second tubular components, at least one of the first and second abutment surfaces being hollowed out by a groove, thereby defining an exterior abutment zone and an interior abutment zone,
   wherein in the made-up state, at least one of the exterior and interior abutment zones forms an axial protuberance, such that contact pressure of the interior abutment zone being exerted in a vicinity of the groove is greater than or equal to a minimum value for contact pressure being exerted in the exterior abutment zone, and
   wherein the exterior and interior abutment zones of the first tubular component or of the second tubular component are not coplanar with one another.

2. The threaded connection according to claim 1, wherein the first abutment surface is provided on the terminal surface of the male end, and the second abutment surface is provided on a shoulder produced on the female end.

3. The threaded connection according to claim 1, wherein the exterior and interior abutment zones of the abutment surface hollowed out by the groove respectively belong to a first plane and to a second plane, which are distinct, each being perpendicular to the axis of revolution, the interior abutment zone protruding with respect to the exterior abutment zone.

4. The threaded connection according to claim 3, wherein the first and the second planes are separated by a value in a range of 0.025 mm to 0.075 mm.

5. The threaded connection according to claim 1, wherein a section of the exterior abutment zone is in a range of 1.5 to 3 times a section of the interior abutment zone.

6. The threaded connection according to claim 1, wherein the first and second abutment surfaces are each hollowed out by a groove, the groove hollowing out the first abutment surface defining, on either side, an exterior abutment zone and an interior abutment zone, and the groove hollowing out the second abutment surface defines an exterior abutment zone and an interior abutment zone on either side.

7. The threaded connection according to claim 1, wherein the male and female ends each comprise at their respective terminal surface a first abutment surface that can come into interfering contact when the connection is in the made-up state against a second abutment surface provided on a shoulder produced on the other of the male end or female end that is on the opposing one of the first and second tubular components.

8. The threaded connection according to claim 1, wherein the first and second tubular components are tubular drilling components.

9. A threaded connection for drilling or working hydrocarbon wells, the connection comprising:
a first and a second tubular component with an axis of revolution, each including a respective male end and female end, at least one of the male end or female end finishing in a terminal surface comprising a first abutment surface that can come into interfering contact when the connection is in a made-up state against a second abutment surface provided on a shoulder produced on an other of the male end or female end that is on an opposing one of the first and second tubular components, at least one of the first and second abutment surfaces being hollowed out by a groove, thereby defining an exterior abutment zone and an interior abutment zone,
wherein in the made-up state, at least one of the exterior and interior abutment zones forms an axial protuberance, such that contact pressure of the interior abutment zone being exerted in a vicinity of the groove is greater than or equal to a minimum value for contact pressure being exerted in the exterior abutment zone, and
wherein the exterior and interior abutment zones of the abutment surface hollowed out by the groove are convex surfaces belonging to a spherical envelope with radius R.

10. The threaded connection according to claim 9, wherein the radius R of the sphere is in a range of 500 mm to 2700 mm.

11. A threaded connection for drilling or working hydrocarbon wells, the connection comprising:
a first and a second tubular component with an axis of revolution, each including a respective male end and female end, at least one of the male end or female end finishing in a terminal surface comprising a first abutment surface that can come into interfering contact when the connection is in a made-up state against a second abutment surface provided on a shoulder produced on an other of the male end or female end that is on an opposing one of the first and second tubular components, at least one of the first and second abutment surfaces being hollowed out by a groove, thereby defining an exterior abutment zone and an interior abutment zone,
wherein in the made-up state, at least one of the exterior and interior abutment zones forms an axial protuberance, such that contact pressure of the interior abutment zone being exerted in a vicinity of the groove is greater than or equal to a minimum value for contact pressure being exerted in the exterior abutment zone, and
wherein the exterior abutment zone of the abutment surface hollowed out by the groove is located in a plane inclined with respect to a plane perpendicular to the axis of revolution at an angle in a range of 0.5 to 2 degrees, and such that a portion proximal to the groove projects with respect to a portion distal to the groove.

12. The threaded connection according to claim 11, wherein the interior abutment zone of the abutment surface hollowed out by the groove is located in a plane inclined with respect to a plane perpendicular to the axis of revolution at an angle in a range of 0.5 to 2 degrees, such that the portion proximal to the groove projects with respect to the portion distal to the groove.

* * * * *